(12) United States Patent
Liu et al.

(10) Patent No.: US 11,424,793 B2
(45) Date of Patent: Aug. 23, 2022

(54) SRS CONFIGURATIONS AND SRS TRANSMISSION

(71) Applicant: LENOVO (BEIJING) LIMITED, Beijing (CN)

(72) Inventors: Bingchao Liu, Beijing (CN); Chenxi Zhu, Fairfax, VA (US); Lingling Xiao, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 17/260,150

(22) PCT Filed: Jul. 13, 2018

(86) PCT No.: PCT/CN2018/095697
§ 371 (c)(1),
(2) Date: Jan. 13, 2021

(87) PCT Pub. No.: WO2020/010632
PCT Pub. Date: Jan. 16, 2020

(65) Prior Publication Data
US 2022/0021420 A1 Jan. 20, 2022

(51) Int. Cl.
*H04W 72/04* (2009.01)
*H04B 7/0456* (2017.01)
*H04L 5/00* (2006.01)

(52) U.S. Cl.
CPC ......... *H04B 7/0456* (2013.01); *H04L 5/0048* (2013.01); *H04W 72/042* (2013.01)

(58) Field of Classification Search
CPC ... H04L 5/0048; H04L 5/0051; H04L 5/0053; H04L 5/0023; H04L 25/0226;
(Continued)

(56) References Cited

U.S. PATENT DOCUMENTS

2013/0078913 A1* 3/2013 Lee .................... H04W 52/146
455/39
2014/0004867 A1* 1/2014 Noh .................... H04W 76/14
455/450
(Continued)

FOREIGN PATENT DOCUMENTS

CN 102355293 A 2/2012
CN 102404029 A 4/2012
(Continued)

OTHER PUBLICATIONS

PCT/CN2018/095697, "International Search Report and the Written Opinion of the International Search Authority" ISA/CN, National Intellectual Property Administration, Office of the PRC China, dated Jul. 13, 2018, pp. 1-7.
OPPO, Further discussion on SRS design for NR, 3GPP TSG RAN WG1 Meeting#91, R1-1719967, Nov. 27-Dec. 1, 2017, Reno, USA, pp. 1-5.

*Primary Examiner* — Eva Y Puente
(74) *Attorney, Agent, or Firm* — Kunzler Bean & Adamson (57) ABSTRACT

Methods, a base unit and a remote unit are disclosed. A method comprises determining two or more SRS resource sets for codebook or non-codebook based UL transmission of the mobile unit in the condition that the number of antenna ports simultaneously used by the mobile unit for transmitting is smaller than the number of antenna ports simultaneously used by the mobile unit for receiving; and transmitting a trigger associated with the two or more SRS resource sets to the mobile unit to trigger resource transmissions by the mobile unit.

19 Claims, 6 Drawing Sheets

(58) Field of Classification Search
CPC ..... H04L 5/0094; H04L 5/001; H04L 5/0091; H04L 5/0007; H04L 5/005; H04L 5/0055; H04L 5/0057; H04W 72/042; H04W 72/0413; H04W 52/146; H04W 24/10; H04W 72/046; H04W 24/08; H04W 72/0446; H04W 72/1289; H04W 74/0833; H04W 52/242; H04W 16/28; H04W 72/0453; H04B 7/0695; H04B 7/088; H04B 7/0404; H04B 17/336; H04B 7/0626; H04B 7/0617; H04B 17/318; H04B 17/345; H04B 7/0639; H04B 7/0691; H04B 17/327; H04B 7/0413; H04B 7/0456
USPC .................................................. 455/39, 450
See application file for complete search history.

(56) References Cited

U.S. PATENT DOCUMENTS

2014/0071922 A1* 3/2014 Zeng ....................... H04L 5/001
370/329
2017/0317866 A1* 11/2017 Stirling-Gallacher ......................
H04B 7/088
2021/0083725 A1* 3/2021 Miao .................... H04B 7/0413
2021/0195582 A1* 6/2021 Takano .................... H04L 5/14

FOREIGN PATENT DOCUMENTS

CN 107294686 A 10/2017
WO 2012008593 A1 1/2012

* cited by examiner

Slot n    Slot n+1

SRS CONFIGURATIONS AND SRS TRANSMISSION

FIELD

The subject matter disclosed herein generally relates to wireless communications and, more particularly, to SRS (Sounding Reference Signal) configurations and SRS transmission.

BACKGROUND

The following abbreviations are herewith defined, some of which are referred to within the following description: Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), New Radio (NR), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Frequency Range 2 (FR2), Physical Uplink Shared Channel (PUSCH), Sounding Reference Signal (SRS), SRS Resource Indication (SRI).

Transmission diversity is an important feature for UL MIMO to provide reliable and robust link performances, especially for cell edge UEs. Dynamic antenna selection and beam selection are two common diversity schemes. For a FR2 UE equipped with multiple antennas using hybrid beam-forming, multiple antenna elements can be virtualized as one antenna port.

Joint antenna and beam switching may provide additional diversity gain if an asymmetric transceiver such as a FR2 UE reports a capability of '1T2R', '1T4R', '2T4R' or '1T4R/2T4R'.

BRIEF SUMMARY

Methods and apparatuses for allowing dynamic antenna switching and beam switching are disclosed.

In one embodiment, a method comprises: determining two or more SRS resource sets for codebook or non-codebook based UL transmission of for the mobile unit in the condition that the number of antenna ports simultaneously used by the mobile unit for transmitting is smaller than the number of antenna ports simultaneously used by the mobile unit for receiving; and transmitting a trigger associated with the two or more SRS resource sets to the mobile unit to trigger SRS resource transmissions by the mobile unit.

In some embodiment, two SRS resource sets are determined; a first SRS resource set is associated with triggering the mobile unit to transmit SRS resources using different antenna ports, and the method further comprising: determining a first SRI for the mobile unit according to the received SRS resources transmitted using different antenna ports, wherein the first SRI indicates selected antenna port(s), and a second SRS resource set is associated with triggering the mobile unit to transmit SRS resources using different beams, and the method further comprising: determining a second SRI for the mobile unit according to the received SRS resources transmitted using the selected antenna port(s) with different beams, wherein the second SRI indicates a selected beam.

In some embodiment, the two SRS resource sets are configured for the mobile unit for non-codebook based UL transmission, with the first SRS resource set configured using a higher layer parameter usage='nonCodebookMode1' and a guard period, and the second SRS resource set configured using a higher layer parameter usage='nonCodebookMode2'. Alternatively, the two SRS resource sets are configured for the mobile unit for codebook based UL transmission, with the first SRS resource set configured using a higher layer parameter usage='CodebookMode1' and a guard period, and the second SRS resource set configured using a higher layer parameter usage='CodebookMode2'. Further alternatively, the two SRS resource sets are configured for the mobile unit for non-codebook based UL transmission, with the first SRS resource set configured using a higher layer parameter usage='nonCodebook' and a guard period, and the second SRS resource set configured using a higher layer parameter usage='nonCodebook'. Still alternatively, the two SRS resource sets are configured for the mobile unit for codebook based UL transmission, with the first SRS resource set is configured using a higher layer parameter usage='codebook' and a guard period, and the second SRS resource set configured using a higher layer parameter usage='codebook'.

In some embodiment, the determined two or more SRS resource sets are included in SRS configuration information, and the method further comprising: transmitting the SRS configuration information.

In another embodiment, a base unit comprises: a processor that determines two or more SRS resource sets for codebook or non-codebook based UL transmission of the mobile unit in the condition that the number of antenna ports simultaneously used by the mobile unit for transmitting is smaller than the number of antenna ports simultaneously used by the mobile unit for receiving; and a transceiver that transmits a trigger associated with the two or more SRS resource sets to the mobile unit to trigger SRS resource transmissions by the mobile unit.

In yet another embodiment, a method comprises: transmitting SRS resources using different antenna ports and/or different beams upon receiving SRS trigger associated with different SRS resource sets with different configurations.

In further embodiment, a remote unit comprises: a transceiver that transmits SRS resources using different antenna ports and/or different beams upon receiving SRS trigger associated with different SRS resource sets with different configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which:

FIG. 4 is a schematic block illustrating a hybrid beamforming architecture;

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions/acts specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The description of elements in each figure may refer to elements of proceeding figures. Like numbers refer to like elements in all figures, including alternate embodiments of like elements.

Figure 1:
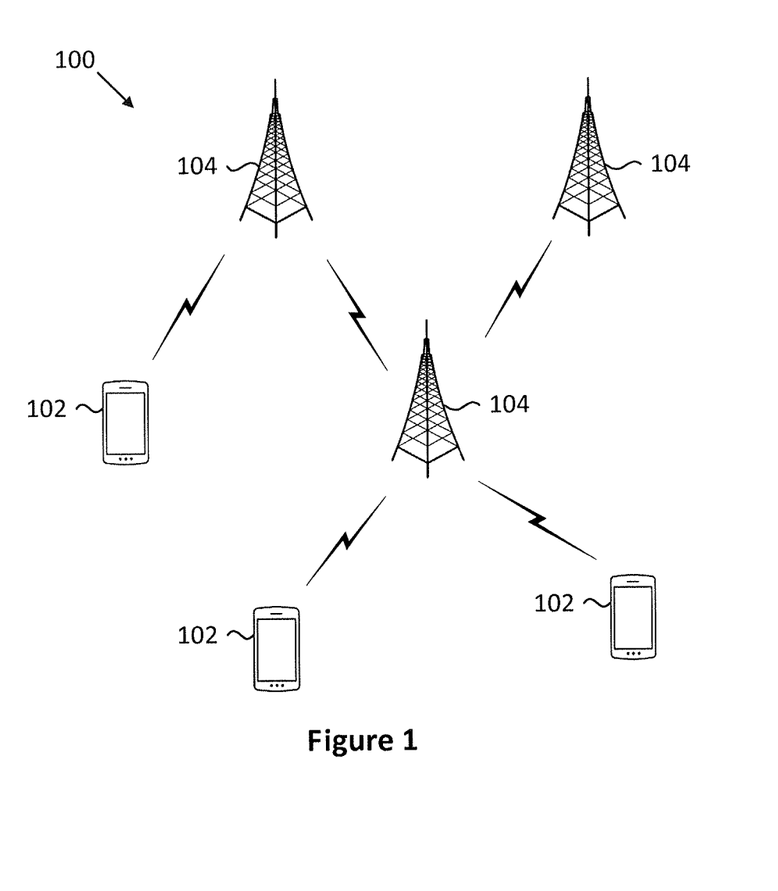
FIG. 1 is a schematic block diagram illustrating one embodiment of a wireless communication system.

FIG. 1 depicts an embodiment of a wireless communication system 100 for allowing dynamic antenna switching and beam switching. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals. A remote unit may connect to the base unit with one or more cells.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR (5G). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
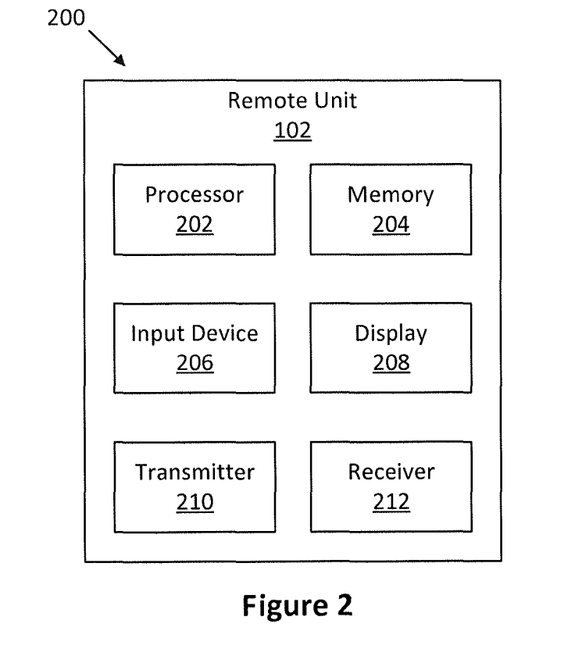
FIG. 2 is a schematic block diagram illustrating one embodiment of an apparatus that may be used for allowing dynamic antenna switching and beam switching.

FIG. 2 depicts one embodiment of an apparatus 200 that may be used for allowing dynamic antenna switching and beam switching. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
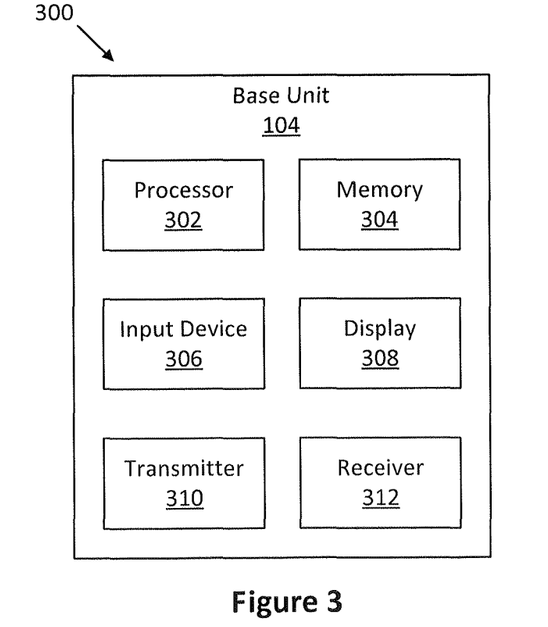
FIG. 3 is a schematic block diagram illustrating one embodiment of an apparatus that may be used for allowing dynamic antenna switching and beam switching.

FIG. 3 depicts one embodiment of an apparatus 300 that may be used for allowing dynamic antenna switching and beam switching. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
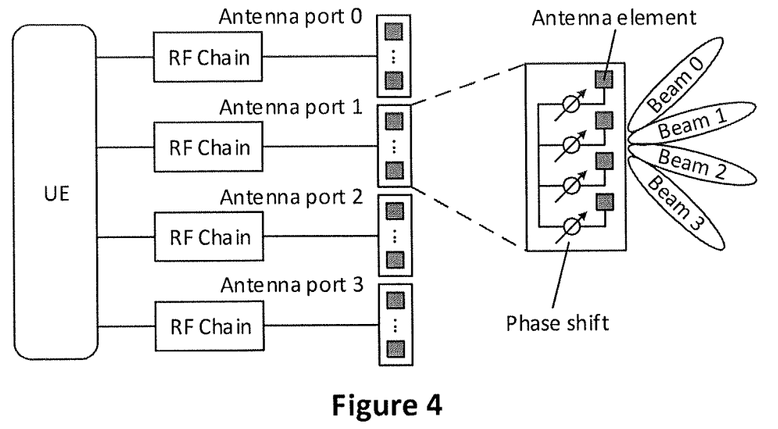

FIG. 4 illustrates the hybrid beam-forming architecture. The UE is an embodiment of remote unit 102. Multiple antenna elements can be virtualized as one antenna port, e.g., Antenna port 1. Analog beam-forming can be performed for a single port or multiple antenna ports and a specific beam, for example, beam 0, beam 1, beam 2 or beam 3, could be chosen to transmit UL signals.

The UE may have different capabilities regarding its transmitting and receiving antennas. For example, the UE may have its capability of '1T1R', '1T2R', '1T4R', '2T2R', '2T4R', '4T4R', '1T4R/2T4R', or etc., in which T represents "Transmit" while R represents "Receive". As a result, '1T', '2T' and '4T' mean that the UE simultaneously uses 1, 2 and 4 antennas, respectively, to transmit UL signals. On the other hand, '1R', '2R' and '4R' means that the UE simultaneously uses 1, 2 and 4 antennas, respectively, to receive DL signals. Apparently, 'xTyR' means that the UE simultaneously uses x antenna(s) to transmit UL signals and simultaneously uses y antenna(s) to receive DL signals, wherein x is an integer, and y is an integer. Preferably, x may be set to 1, 2 or 4 and y may be set to 1, 2 or 4. For example, '1T4R/2T4R' means that the UE support both '1T4R' and '2T4R'.

The antenna(s) described above are illustrated as antenna port(s) or RF chain(s) in FIG. 4. As described above, analog beam-forming can be performed for a single or multiple antenna ports. In the condition that the UE simultaneously uses x (x>1, e.g., x=2 or 4) antenna ports to transmit UL signals, the analog beam-forming can be performed for the x antenna ports.

Antenna switching means gNB and/or UE choose the antenna port(s) to be used for transmitting UL signals. Generally, all of the antenna ports of the UE can be used for receiving DL signals. Therefore, '1T4R' basically means that the UE has 4 antenna ports (the UE may simultaneously use all of 4 antenna ports to receive DL signals) and that the UE can only simultaneously use only 1 antenna port to transmit UL signals. Apparently, only in the condition that the number of antenna ports for transmitting is smaller than the total number of antenna ports (that are usually the number of antenna ports for receiving), it is necessary to perform antenna switching.

Beam switching means that gNB and/or UE choose an analog beam for the selected antenna port(s). After antenna ports are selected, the analog beam-forming may be performed on the selected antenna ports. This indicates that analog beams are formed using the antenna elements of the selected antenna ports. Ultimately, one analog beam would be selected.

Figure 5:
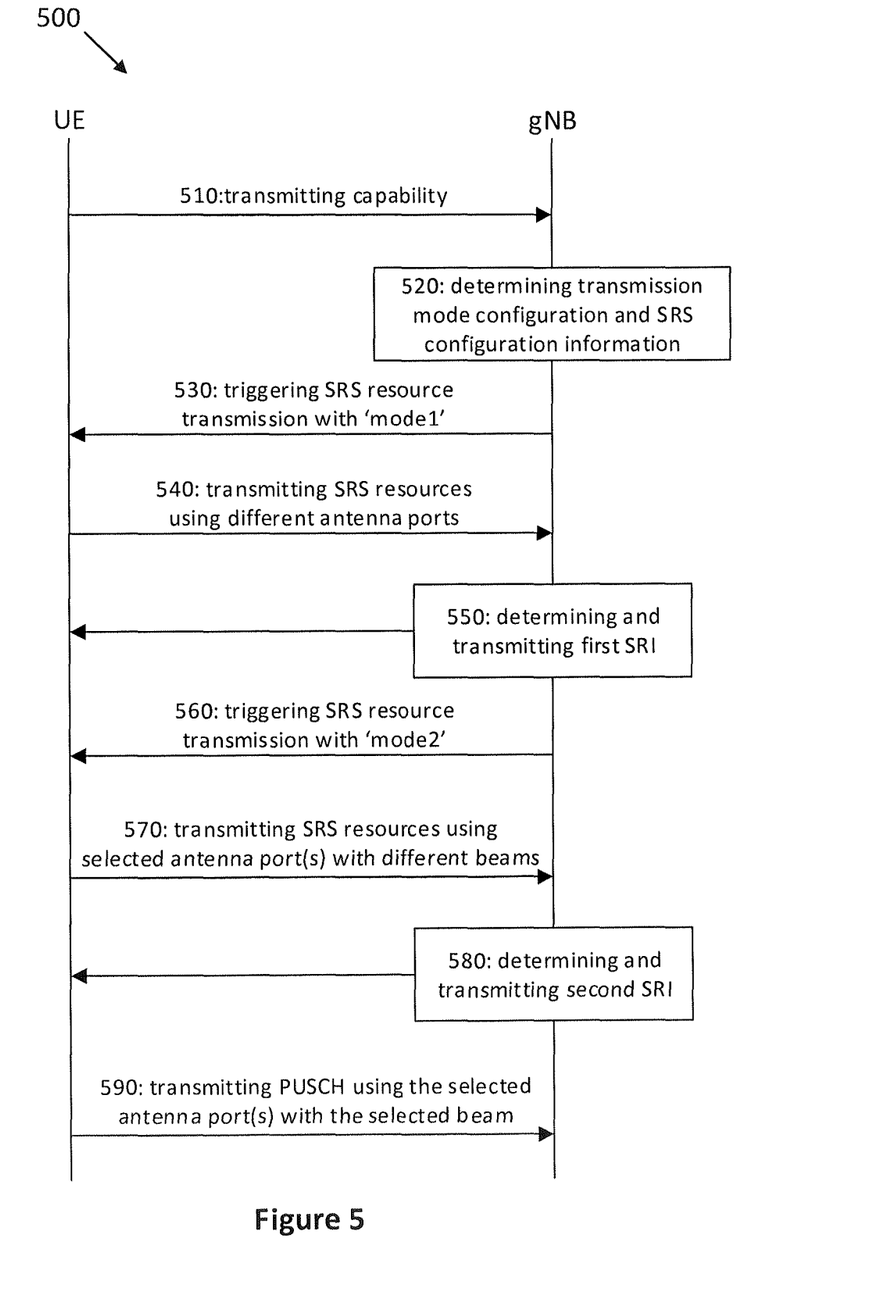
FIG. 5 is a schematic flow chart diagram illustrating a first embodiment of a method for allowing dynamic antenna switching and beam switching.

FIG. 5 is a schematic flow chart diagram illustrating the first embodiment of a method for allowing dynamic antenna switching and beam switching.

In step 510, UE transmits (reports) its capability to a gNB. The capability of the UE includes whether it will perform codebook based UL transmission or non-codebook based UL transmission, and its antenna port transmitting and receiving configuration, e.g., '1T1R', '1T2R', '1T4R', '2T2R', '2T4R', '4T4R', '1T4R/2T4R', or etc.

In step 520, upon receiving the capability reported by the UE, the gNB determines transmission mode configuration and SRS configuration information.

The transmission mode configuration may be indicated by a higher layer parameter txConfig in PUSCH-Config, which can be set to 'codebook' or 'nonCodebook' to indicate whether codebook based UL transmission or non-codebook based UL transmission will be performed at the UE.

As described above, suppose that a capability of the UE is xTyR, only in the condition that x (the number of antenna ports simultaneously used for transmitting) is smaller than y (the total number of antenna ports that is usually the number of antenna ports simultaneously used for receiving), antenna switching can be performed. For example, the gNB may determine the SRS configuration information when the UE reports its capability with '1T2R', '1T4R', '2T4R', '2T4R/1T4R' for non-codebook based UL transmission or '2T4R' or '2T4R/1T4R' for codebook based UL transmission.

The SRS configuration information includes two or more SRS resource sets configured to the UE. Preferably, two SRS resource sets will be configured to the UE, wherein one SRS resource set would be used for switching antenna ports, and the other SRS resource set would be used for switching beams.

Each SRS resource set is configured with different usage values defined in SRS-ResourceSet for codebook and non-codebook based UL transmissions. One of the two SRS resource sets can be configured with usage='nonCodebookMode1' for non-codebook based UL transmission or configured with usage='codebookMode1' for codebook based UL transmission, and a guard period to be configured between different SRS resources for antenna switching. The other SRS resource set can be configured with usage='nonCodebookMode2' for non-codebook based UL transmission or configured with usage='codebookMode2' for codebook based UL transmission.

The transmission mode configuration and the SRS configuration information are preferably transmitted to the UE in step 520.

In step 530, the gNB triggers SRS resource transmissions within the SRS resource set configured with usage='nonCodebookMode1' or 'codebookMode1'.

Upon receiving the trigger, UE transmits, in step 540, each of the SRS resources within the SRS resource set configured with usage='nonCodebookMode1' or 'codebookMode1' using different antenna ports.

In step 550, the gNB determines a first SRI (SRS resource indication) to indicate the selected antenna port(s) for the subsequent SRS or PUSCH transmission and transmits the first SRI to the UE. The determination is made in view of the SRS resources received from different antenna ports of the UE. The detailed algorithm for the determination may be different at different gNBs.

In step 560, the gNB triggers SRS resource transmissions within the other SRS resource set configured with usage='nonCodebookMode2' or 'codebookMode2'.

Upon receiving the trigger, the UE transmits, in step 570, each of the SRS resources within the other SRS resource set configured with usage='nonCodebookMode2' or 'codebookMode2' with different beams using the selected antenna port(s) indicated by the SRI determined in step 550.

In step 580, the gNB determines a second SRI to indicate the selected beam for PUSCH transmission and transmits the second SRI to the UE. The determination is made in view of the SRS resources received from different beams. The detailed algorithm for the determination may be different at different gNBs.

In step 590, the UE transmits the PUSCH using the selected antenna ports with the selected beam indicated by the gNB.

It can be seen from FIG. 5 that the antenna ports can be selected (switched) by using the SRS resource set with usage='nonCodebookMode1' or 'codebookMode1', while the beam can be selected (switched) by using the SRS resource set with usage='nonCodebookMode2' or 'codebookMode2'. As a whole, the UE may transmit the PUSCH using the selected (switched) antenna port(s) with the selected (switched) beam. Therefore, the dynamic antenna switching and beam switching can be performed at the same time.

Figure 6:
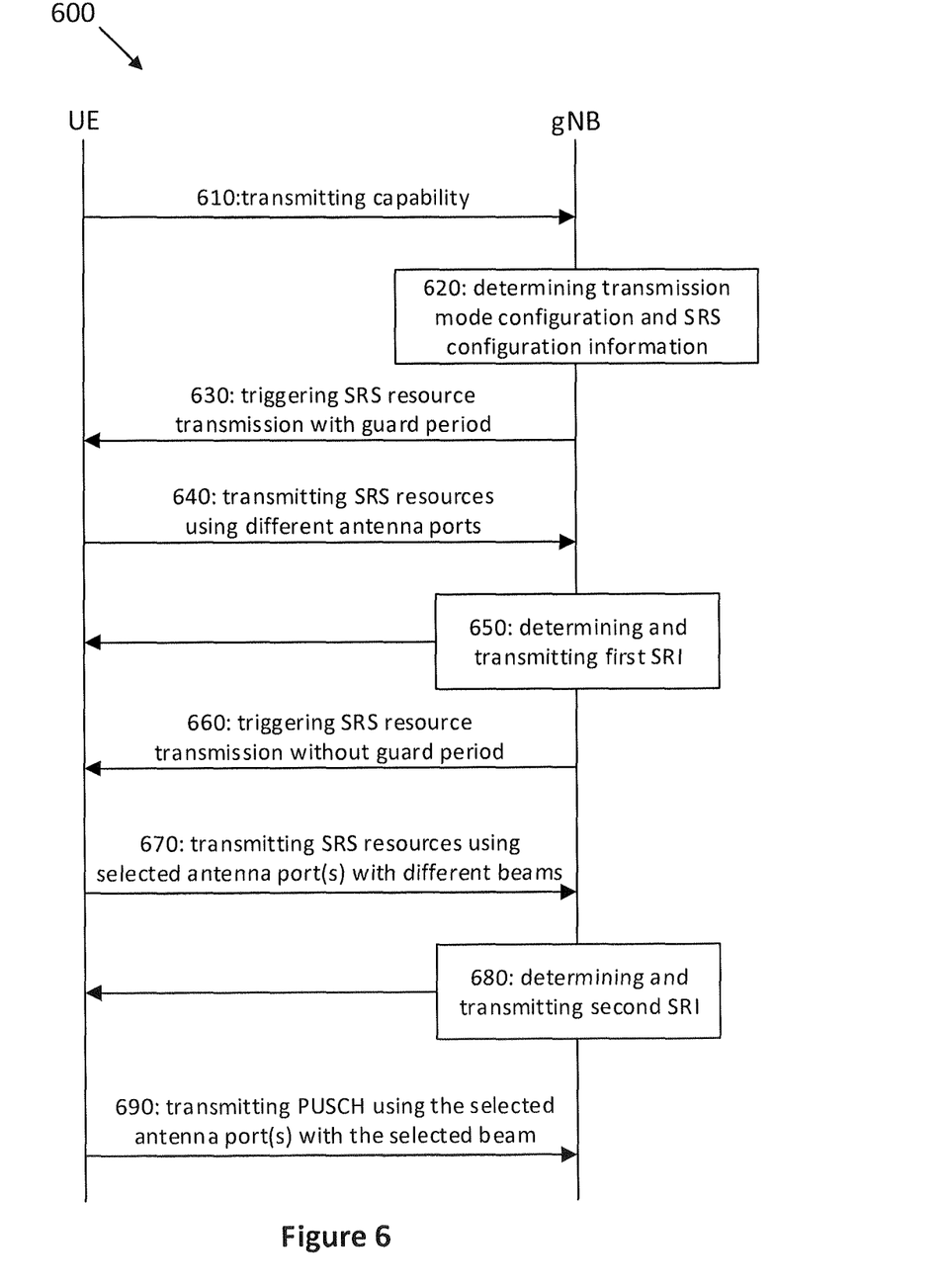
FIG. 6 is a schematic flow chart diagram illustrating a second embodiment of a method for allowing dynamic antenna switching and beam switching.

FIG. 6 is a schematic flow chart diagram illustrating the second embodiment of a method for allowing dynamic antenna switching and beam switching.

The second embodiment differs from the first embodiment in that both SRS resource sets are configured with the same value of usage='nonCodebook' for non-codebook based UL transmission or usage='codebook' for codebook based UL transmission.

The two SRS resource sets are differentiated by whether or not a guard period is configured. The guard period refers to a period indicated by Y symbols (Y is an integer). In the condition that the SRS resources in a SRS resource set are transmitted in the same slot, the UE does not transmit any signals in the guard period. In other words, after a SRS resource is transmitted in a symbol, no signals are transmitted for Y symbols before another SRS resource is transmitted.

In the condition that the guard period is configured in a SRS resource set, it implicitly indicates that the SRS resource set is used for selecting (switching) the antenna ports. On the other hand, in the condition that the guard period is NOT configured in another SRS resource set, the other SRS resource set is used for selecting (switching) the beams.

According to the second embodiment, both the SRS resource sets are configured with the same higher layer parameter usage value, i.e., usage='codebook' or 'nonCodebook' in step 620. The indication of the SRS resource set being used for selecting (switching) the antenna ports or the beams lies in whether a guard period is configured. In particular, the SRS resource set configured with the guard period would be used in triggering the SRS resource transmission in step 630; while the SRS resource set configured without the guard period will be used in triggering the SRS resource transmission in step 660.

In short, except for steps 620, 630 and 660, the other steps 610, 640, 650, 670, 680 and 690 are the same as steps 510, 540, 550, 570, 580 and 590. In step 620, both the SRS resource sets are configured with the same higher layer parameter usage value, i.e., usage='codebook' or 'nonCodebook'. In step 630, the gNB triggers the SRS resource transmissions within the SRS resource set configured with usage='nonCodebook' or 'codebook' along with the guard period. In step 660, the gNB triggers the SRS resource transmissions within the SRS resource set configured with usage='nonCodebook' or 'codebook' (without the guard period).

FIGS. 7A-7E illustrate some examples of selecting the antenna ports.

Suppose that a UE is capable of transmitting up to X SRS resources simultaneously, and the UE is configured with N SRS resources for non-codebook based transmission. X represents the RF chains (or antenna ports) that can be simultaneously used for transmitting UL signals (see FIG. 4). For example, if the UE reports its capability with '1T2R' or '1T4R', X=1; and if the UE reports its capability with '2T4R', X=2. Theoretically, X may be set to a value up to the number of antenna ports. If the UE has 4 antenna ports, X can take a value out of {1, 2, 3, 4}. N is the number of SRS resources configured in the SRS resource set, for example in the first embodiment, when usage='nonCodebookMode1'. N can also take a value out of {1, 2, 3, 4}.

When N>X, that is, there are more SRS resources configured by gNB than the number of SRS resources, UE can simultaneously transmit, antenna (antenna port) switching can be supported.

Figure 7A:
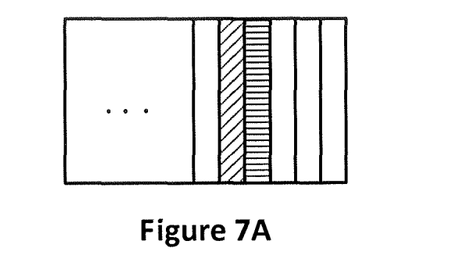
FIGS. 7A-7E illustrate examples of selecting antenna ports.
Figure 7B:
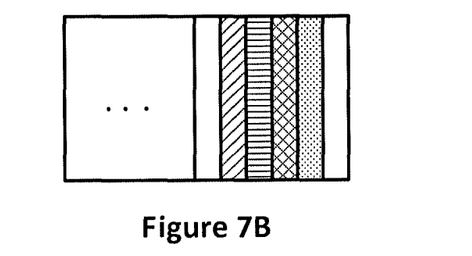

FIG. 7A shows the configuration: X=1, N=2. FIG. 7B shows the configuration: X=1, N=4. More than 1 SRS resource (2 SRS resources in FIG. 7A and 4 SRS resources in FIG. 7B) is configured in different symbols. Therefore, the UE can transmit SRS resources in different symbols using different antenna ports.

Figure 7C:
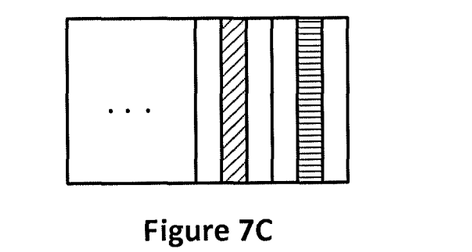

FIG. 7C shows another configuration: X=1, N=2 with a guard period being 2. The configurations in FIGS. 7A and 7B can be regarded as the guard period being configured to 0. The first SRS resource can be transmitted using one antenna port in a certain symbol, while the second SRS resource can be transmitted using another antenna port in a symbol that is 2 symbols away (i.e., guard period=2 symbols) from the certain symbol.

Figure 7D:
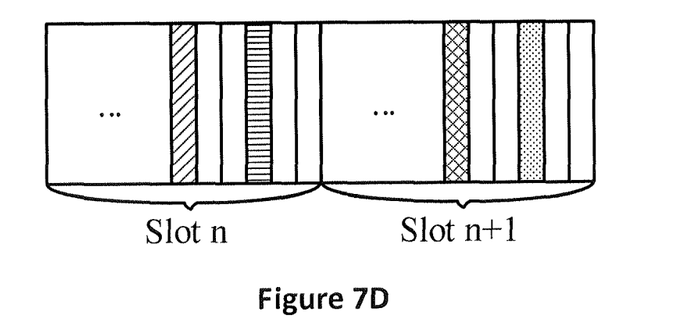

FIG. 7D shows another configuration: X=1, N=4 with a guard period being 2. As the SRS resources can be only configured in the last 6 symbols of a slot, in the condition that the guard period is 2 symbols, it is impossible to transmit 4 SRS resources in the same slot. As shown in FIG. 7D, two slots (slot n and slot n+1) are used to transmit 4 SRS resources. In this condition, the guard period configuration has to apply to different slots. However, if the SRS resource set for PUSCH transmission is aperiodic, the guard period can be only configured for a certain slot. The guard period for a different slot has to be configured separately. In this condition, an extra SRS resource set (a third SRS resource set) might be necessary.

Figure 7E:
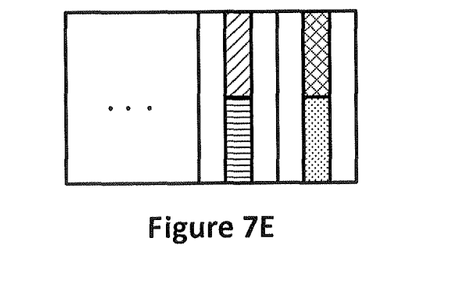

FIG. 7E shows configuration: X=2, N=4 with a guard period being 2. When X=2, 2 SRS resources can be transmitted in each symbol.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
   determining two or more sounding reference signal resource sets for codebook or non-codebook based uplink transmission of a mobile unit based on a number of antenna ports simultaneously used by the mobile unit for transmitting is smaller than the number of antenna ports simultaneously used by the mobile unit for receiving; and
   transmitting a trigger associated with the two or more sounding reference signal resource sets to the mobile unit to trigger sounding reference signal resource transmissions by the mobile unit.

2. The method of claim 1, wherein two or more sounding reference signal resource sets are determined;
   a first sounding reference signal resource set is associated with triggering the mobile unit to transmit sounding reference signal resources using different antenna ports, and the method further comprising: determining a first sounding reference signal resource indication for the mobile unit according to the received sounding reference signal resources transmitted using different antenna ports, wherein the first sounding reference signal resource indication indicates selected antenna port(s), and
   a second sounding reference signal resource set is associated with triggering the mobile unit to transmit sounding reference signal resources using different beams, and the method further comprising: determining a second sounding reference signal resource indication for the mobile unit according to the received sounding reference signal resources transmitted using the selected antenna port(s) with different beams, wherein the second sounding reference signal resource indication indicates a selected beam.

3. The method of claim 2, wherein the two or more sounding reference signal resource sets are configured for the mobile unit for non-codebook based uplink transmission, with the first sounding reference signal resource set configured using a higher layer parameter usage equals 'nonCodebookMode1' and a guard period, and the second sounding reference signal resource set configured using a higher layer parameter usage equals 'nonCodebookMode2'.

4. The method of claim 2, wherein the two or more sounding reference signal resource sets are configured for the mobile unit for codebook based uplink transmission, with the first sounding reference signal resource set configured using a higher layer parameter usage equals 'CodebookMode1' and a guard period, and the second sounding reference signal resource set configured using a higher layer parameter usage equals 'CodebookMode2'.

5. The method of claim 2, wherein the two or more sounding reference signal resource sets are configured for the mobile unit for non-codebook based uplink transmission, with the first sounding reference signal resource set configured using a higher layer parameter usage equals 'nonCodebook' and a guard period, and the second sounding reference signal resource set configured using a higher layer parameter usage equals 'nonCodebook'.

6. The method of claim 2, wherein the two or more sounding reference signal resource sets are configured for the mobile unit for codebook based uplink transmission, with the first sounding reference signal resource set is configured using a higher layer parameter usage equals 'codebook' and a guard period, and the second sounding reference signal resource set configured using a higher layer parameter usage equals 'codebook'.

7. The method of claim 1, wherein the determined two or more sounding reference signal resource sets are included in sounding reference signal configuration information, and the method further comprising: transmitting the sounding reference signal configuration information to the mobile unit.

8. A base unit comprising:
a processor that determines two or more sounding reference signal resource sets for codebook or non-codebook based uplink transmission of a mobile unit based on a number of antenna ports simultaneously used by the mobile unit for transmitting is smaller than the number of antenna ports simultaneously used by the mobile unit for receiving; and
a transceiver that transmits a trigger associated with the two or more sounding reference signal resource sets to the mobile unit to trigger sounding reference signal resource transmissions by the mobile unit.

9. The base unit of claim 8, wherein the processor determines two or more sounding reference signal resource sets;
a first sounding reference signal resource set is associated with triggering the mobile unit to transmit sounding reference signal resources using different antenna ports, and the processor further determines a first sounding reference signal resource indication for the mobile unit according to the received sounding reference signal resources transmitted using different antenna ports, wherein the first sounding reference signal resource indication indicates selected antenna port(s), and
a second sounding reference signal resource set is associated with triggering the mobile unit to transmit sounding reference signal resources using different beams, and the processor further determines a second sounding reference signal resource indication for the mobile unit according to the received sounding reference signal resources transmitted using the selected antenna port(s) with different beams, wherein the second sounding reference signal resource indication indicates a selected beam.

10. The base unit of claim 9, wherein the two or more sounding reference signal resource sets are configured for the mobile unit for non-codebook based uplink transmission, with the first sounding reference signal resource set configured using a higher layer parameter usage equals 'nonCodebookMode1' and a guard period, and the second sounding reference signal resource set configured using a higher layer parameter usage equals 'nonCodebookMode2'.

11. The base unit of claim 9, wherein the two or more sounding reference signal resource sets are configured for the mobile unit for codebook based uplink transmission, with the first sounding reference signal resource set configured using a higher layer parameter usage equals 'CodebookMode1' and a guard period, and the second sounding reference signal resource set configured using a higher layer parameter usage equals 'CodebookMode2'.

12. The base unit of claim 9, wherein the two or more sounding reference signal resource sets are configured for the mobile unit for non-codebook based uplink transmission, with the first sounding reference signal resource set configured using a higher layer parameter usage equals 'nonCodebook' and a guard period, and the second sounding reference signal resource set configured using a higher layer parameter usage equals 'nonCodebook'.

13. The base unit of claim 9, wherein the two or more sounding reference signal resource sets are configured for the mobile unit for codebook based uplink transmission, with the first sounding reference signal resource set configured using a higher layer parameter usage equals 'codebook' and a guard period, and the second sounding reference signal resource set configured using a higher layer parameter usage equals 'codebook'.

14. The base unit of claim 8, wherein the determined two or more sounding reference signal resource sets are included in sounding reference signal configuration information, and the transceiver further transmits the sounding reference signal configuration information to the mobile unit.

15. A method comprising: transmitting sounding reference signal resources using different antenna ports and/or different beams upon receiving sounding reference signal triggers associated with different sounding reference signal resource sets with different configurations;
wherein two sounding reference signal triggers associated with two sounding reference signal resource sets are received;
upon receiving a first sounding reference signal trigger associated with a first resource set, transmitting sounding reference signal resources using different antenna ports and receiving a first sounding reference signal resource indication indicating selected antenna port(s); and
upon receiving a second sounding reference signal trigger associated with a second resource set, transmitting sounding reference signal resources using the selected antenna port(s) with different beams and receiving a second sounding reference signal resource indication indicating a selected beam.

16. The method of claim 15, wherein the first sounding reference signal resource set is configured using a higher layer parameter usage equals 'nonCodebookMode1' and a guard period, or a higher layer parameter usage equals 'codebookMode1' and a guard period, or a higher layer parameter usage equals 'nonCodebook' and a guard period, or a higher layer parameter usage equals 'codebook' and a guard period.

17. The method of claim 15, wherein the second sounding reference signal resource set is configured using a higher layer parameter usage equals 'nonCodebookMode2', or a higher layer parameter usage equals 'codebookMode2', or a higher layer parameter usage equals 'nonCodebook', or a higher layer parameter usage equals 'codebook'.

18. The method of claim 15, further comprising receiving sounding reference signal configuration information including a determined two or more sounding reference signal resource sets.

19. The method of claim 15, further comprising, transmitting on physical uplink shared channel using a selected antenna port(s) with a selected beam.

* * * * *